H. P. MANLEY, OF ELLSWORTH, NEW YORK.

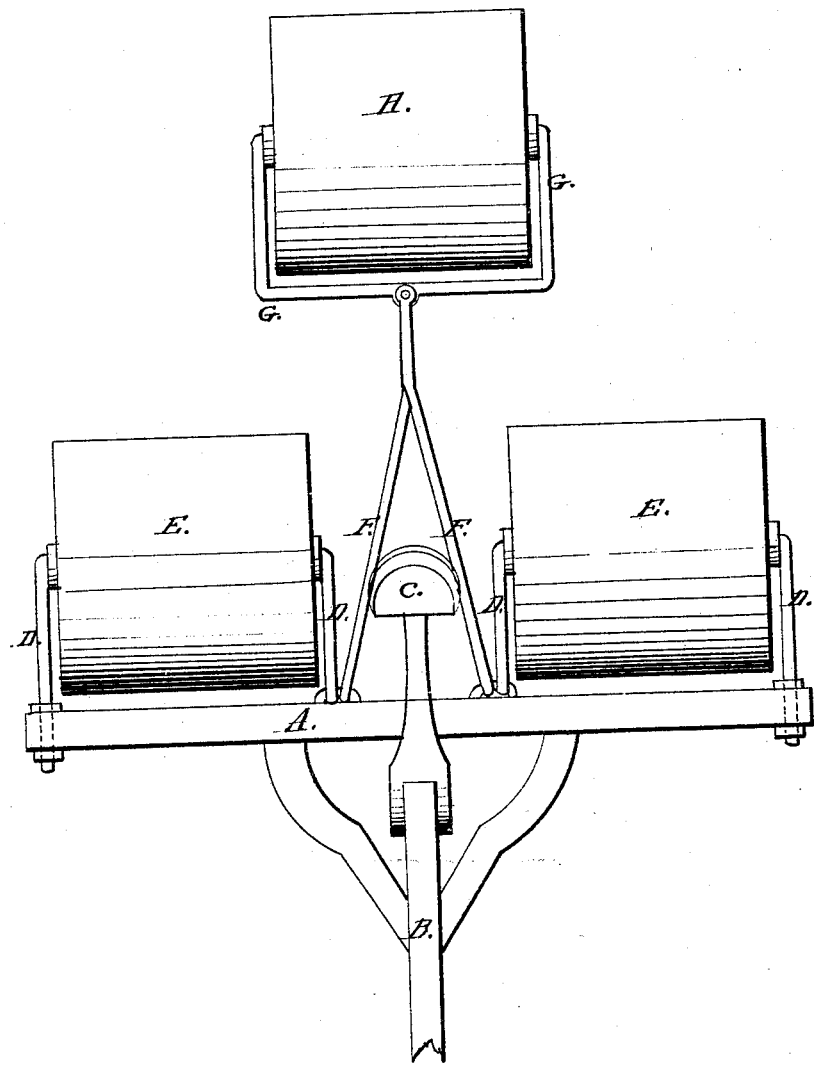

*Letters Patent No. 86,087, dated January 19, 1869.*

IMPROVEMENT IN LAND-ROLLERS.

The Schedule referred to in these Letters Patent and making part of the same.

*To all whom it may concern:*

Be it known that I, H. P. MANLEY, of Ellsworth, in the county of St. Lawrence, and in the State of New York, have invented certain new and useful Improvements in "Land-Rollers;" and do hereby declare that the following is a full, clear, and exact description thereof, reference being had to the accompanying drawings, and to the letters of reference marked thereon.

The nature of my invention consists in constructing a land-roller with one or more following-rollers.

In order to enable others skilled in the art to which my invention appertains, to make and use the same, I will now proceed to describe its construction and operation, referring to the annexed drawings, which form a part of this specification, and which represent a plan view of my invention.

A represents a beam or bar, to the centre of which the tongue B is secured.

A seat, C, for the driver, is also arranged, in any manner suitable, on or near the beam A.

From the rear side of the beam A extend two or more frames or bent bars, D D, forming suitable axles for the rollers E E. These frames or bent bars D D are placed at any desired distance apart, and are perfectly independent of each other, not being in anywise connected, except through the beam A.

Between the frames D D, rods F F are secured to the beam A, which rods extend a suitable distance in rear of the rollers E E, where they are joined together, and pivoted to the centre of another frame or bent bar, G, in which a roller, H, is placed, which roller operates on the earth left between the two preceding rollers E E.

The frame G being pivoted to the rods F F, allows the machine to turn any corners, or go from one place to another with ease.

I do not confine myself to any definite number of rollers, as it is evident they may be placed, on the plan above described, to any number desired.

I am aware that connecting the rollers to the main frame, so as to admit of independent action, is not new.

Having thus fully described my invention,

What I claim as new, and desire to secure by Letters Patent, is—

1. The combination of the rollers E E with the elongated beam A, when said rollers are connected to the beam independently, by the angular bars D D, all substantially as herein shown and described.

2. The combination of the forked rod F, and its rectangular bar G, supporting the roller H, with the bar A and rollers E E, all constructed, arranged, and operating substantially as shown and described.

In testimony that I claim the foregoing, I have hereunto set my hand, this 10th day of October, 1868.

H. P. MANLEY.

Witnesses:
S. B. GORDON,
S. C. CRANE.